United States Patent Office 3,813,420
Patented May 28, 1974

3,813,420
13-POLYCARBONALKYL-3,11,17,20,21-PENTA-
OXYGENATED-18-NORPREGNENES
George H. Douglas, Paoli, Pa., Warren R. Faust, Newark, Del., and Herchel Smith, Wayne, Pa., assignors to American Home Products Corporation, New York, N.Y.
No Drawing. Original application Feb. 5, 1969, Ser. No. 799,148, now abandoned. Divided and this application Aug. 17, 1971, Ser. No. 172,544
Int. Cl. C07c *169/34*
U.S. Cl. 260—397.45                3 Claims

ABSTRACT OF THE DISCLOSURE 13-polycarbonalkyl (PCA) - 3,11,17,20,21 - pentaoxygenated - 18 - norpregnenes, $\Delta^1$-dehydroanalogs and acyl esters thereof, particularly of Formula I:

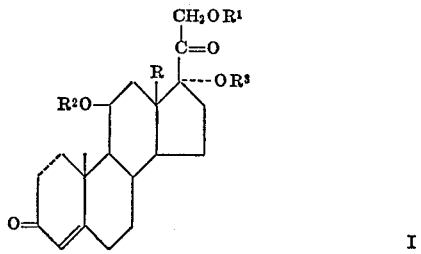

I wherein R is alkyl of 2–6 carbon atoms, $R^1$, $R^2$ and $R^3$ are hydrogen or acyl and the broken line indicates an optional double bond, are provided.

One pathway comprises epoxidizing and isomerizing a 13 - PCA - 17α - ethyl - 3 - alkoxygona - 1,3,5(10),8-tetraene-17-ol (II) to produce a 13-PCA - 17α - ethyl-3-alkoxygona - 1,3,5(10),8 - tetraen - 11 - on - 17 - ol (III); reducing (III) produces a 13-PCA-17α-ethyl - 3 - alkoxygona - 1,3,5(10) -trien-11-on-17-ol (IV); reducing (IV) produces a 13 - PCA - 17α - ethyl - 3 - alkoxygona-1,3, 5(10) - trien - 11β,17α - diol (V); acylating (V) to produce the corresponding 11-acylate (VI); dehydrating (VI) to produce a 13-PCA - 3 - alkoxy - 18,19 - dinorpregna-1,3,5(10),17(20) - tetraen - 11β - ol, acylate (VII); removing the protective acylate group to produce a 13-PCA-3 - alkoxy - 18,19 - dinorpregna-1,3,5(10),17(20)-tetraen-11β-ol (VIII); reducing (VIII) to produce a 13-PCA-3-alkoxy - 18,19 - dinorpregna - 2,5(10),17(20) - trien-11β-ol (IX); hydrolyzing (IX) to produce a 13-PCA-18, 19-dinorpregna - 5(10),17(20) - dien - 3 - on - 11β - ol (X); methylenating (X) to produce a 13-PCA-18-norpregna - 4,17(20) - diene-3-on-11β-ol (XI); oxidatively hydroxylating (XI) to produce a 13-PCA - 18 - norpregn-4-en - 3,20 - dione-11β,17α-diol (XII); iodinating (XII) to produce a 13-PCA - 21 - iodo - 18 - norpregn-4-ene-3,20 - dione - 11β,17α - diol (XIII); and alkanoylizing (XIII) to produce a 13-PCA - 18 - norpregn-4-en-3,20-dione - 11β,17α,21 - triol, 21-acylate (Ia). Hydrolysis of (Ia) provides the corresponding 21-free alcohol (Ib); acylation of (Ib) provides the corresponding acylate (Ic). Delta - 1 - dehydrogenation, chemically or microbiologically, provides the corresponding dehydro analogs (Id, Ie and If).

In a second pathway, (XII) is converted to the corresponding enamine (XVI); acidification and bromination of (XVI) produces the corresponding 21-bromo-enamine salt (XVII); hydrolysis of (XVII) produces the corresponding 21-bromo - 13 - PCA - 18 - norpregn-4-en-3,20-dione - 11β,17α - diol (XIIIa); and alkanoylization of (XIII) produces (Ia).

Compounds (I) are pharmacologically active as anti-inflammatory agents, reducing experimentally-induced edemae in laboratory animals. Compounds (XI), (XII),
(XIII), (XIIIa), (XVI) and (XVII) are novel and valuable intermediates for (I).

This application is a division of our prior, copending application Ser. No. 799,148, filed Feb. 5, 1969, now abandoned.

This invention relates to steroids with pharmacological activity, to processes for their preparation and to intermediates useful therein. More particularly, it relates to steroids of the 18-norpregnene series, substituted with polycarbon alkyl at the 13-position, keto at the 3-position, β-hydroxy or β-acyloxy at the 11-position, α-hydroxy or α-acyloxy at the 17-position, keto at the 3-position and hydroxy or acyloxy at the 21-position, and the delta-1-dehydro analogs thereof. These compounds have pharmacological activity, particularly corticosteroidal activity, in warm-blooded lower animals in standard laboratory tests.

DESCRIPTION OF THE INVENTION

The compounds of this invention are those of Formula I:

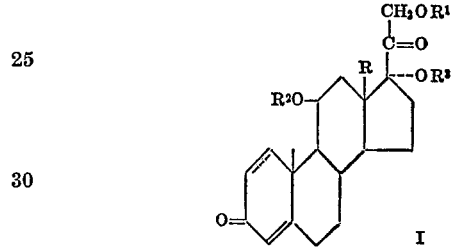

I wherein R is polycarbon (lower)alkyl; $R^1$, $R^2$ and $R^3$ are hydrogen or (lower)alkanoyl, and the broken line indicates a single bond or a double bond.

Also contemplated by this invention is an embodiment which is a pharmaceutical composition comprising a compound of Formula I and a pharmaceutically-acceptable carrier.

Special mention also is made of particularly preferred and important compounds within the scope of Formula I. These comprise compounds wherein R is ethyl, $R^1$, $R^2$ and $R^3$ are hydrogen or acetyl and the broken line indicates a single bond or a broken bond; and especially 11β,17α,21 - trihydroxy-13-ethyl-18-norpregn-4-en-3,20-dione, and the 21-monoacetate thereof; and 11β,17α,21 - trihydroxy-13-ethyl-18-norpregna-1,4-dien-3,20-dione, and the 21-monoacetate thereof.

Compounds of Formula I exhibit glucocorticoid activity and are of value to alleviate experimentally induced inflammatory conditions in standard laboratory animals, such as rats.

When used herein and in the appended claims, the term polycarbon(lower)alkyl contemplates alkyl groups, straight chain and branched of from about 2 to about 6 carbon atoms, illustrative members of which are ethyl, n-propyl, isopropyl, butyl, pentyl n-hexyl and the like. The term "(lower)alkanoyloxy" contemplates groups containing from about 2 to about 6 carbon atoms, illustrative members of which are acetyl, propionyl, butyroyl, pentanoyl, and the like. The term (lower)alkyl contemplates alkyl of from 1 to about 6 carbon atoms and is illustrated by methyl and those polycarbon(lower)alkyl groups mentioned above. It is preferable that the polycarbonalkyl group in the 13-position be a 13β-group.

The instant invention in one of its embodiments contemplates processes to produce compounds of Formula I. The essence of this aspect is the discovery that useful compounds can be prepared by applying known reaction conditions to a variety of known and unknown intermediates in a highly selective manner. Furthermore, the value of the instant synthetic methods lies in the provision of compounds of Formula I which are difficult to prepare by a totally synthetic route for the following reasons: (a) they possess a number of functional groups, some of which have to protected while some of the others are being modified; (b) the side chain at the 17-position has a complex nature, particularly from the stereo-chemical point of view and the building up of it presents considerable problems; (c) there is a danger of epimerization at the 9-position in most standard methods when the oxygenated function is being introduced at the 11-position, particularly in compounds where ring A is aromatic; and (d) a stage in the sequence must be found for introduction of the required 10-methyl group into readily accessible totally synthetic steroid starting materials. These objects are achieved in one aspect of this invention which is a process outlined in the following *first* pathway:

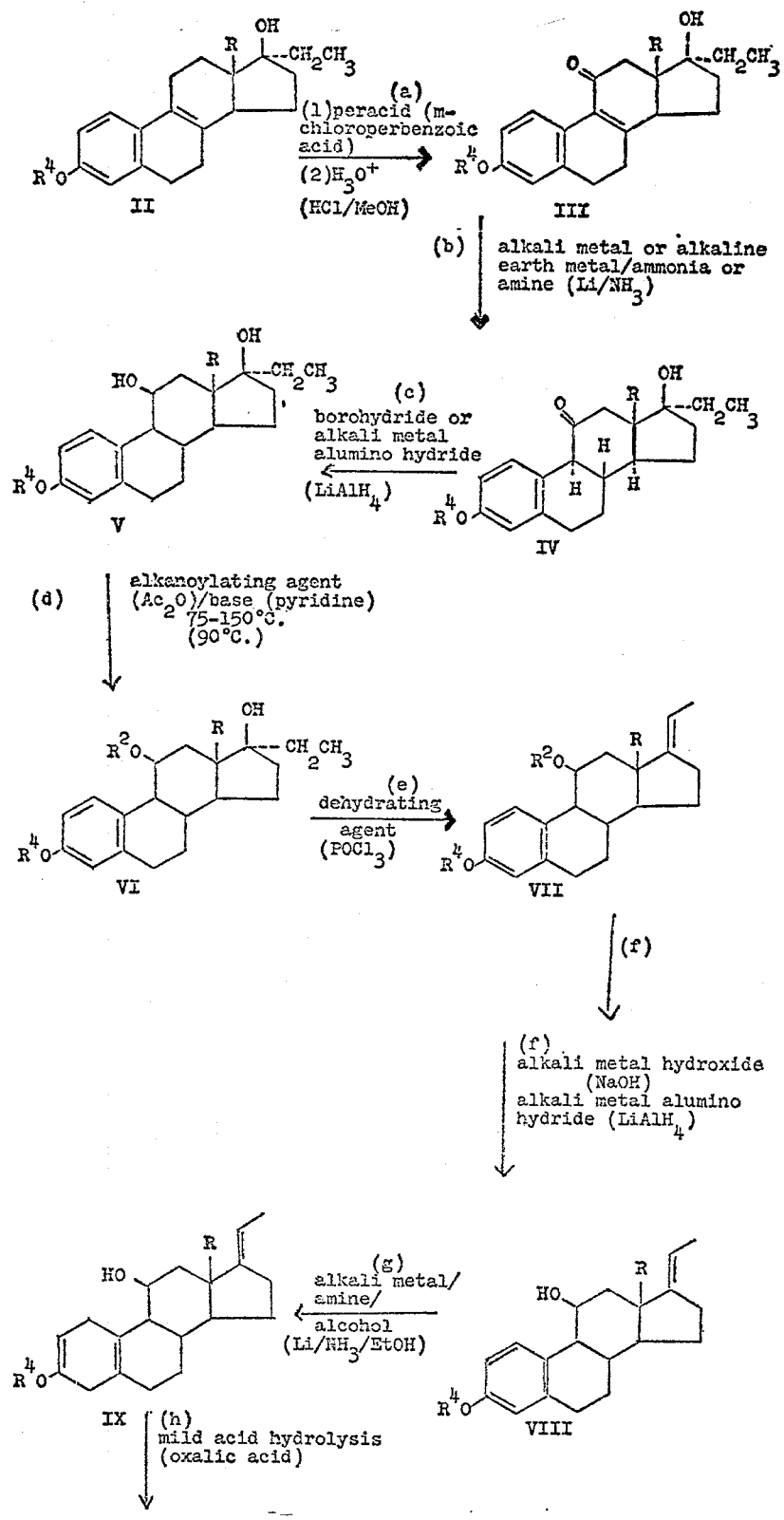

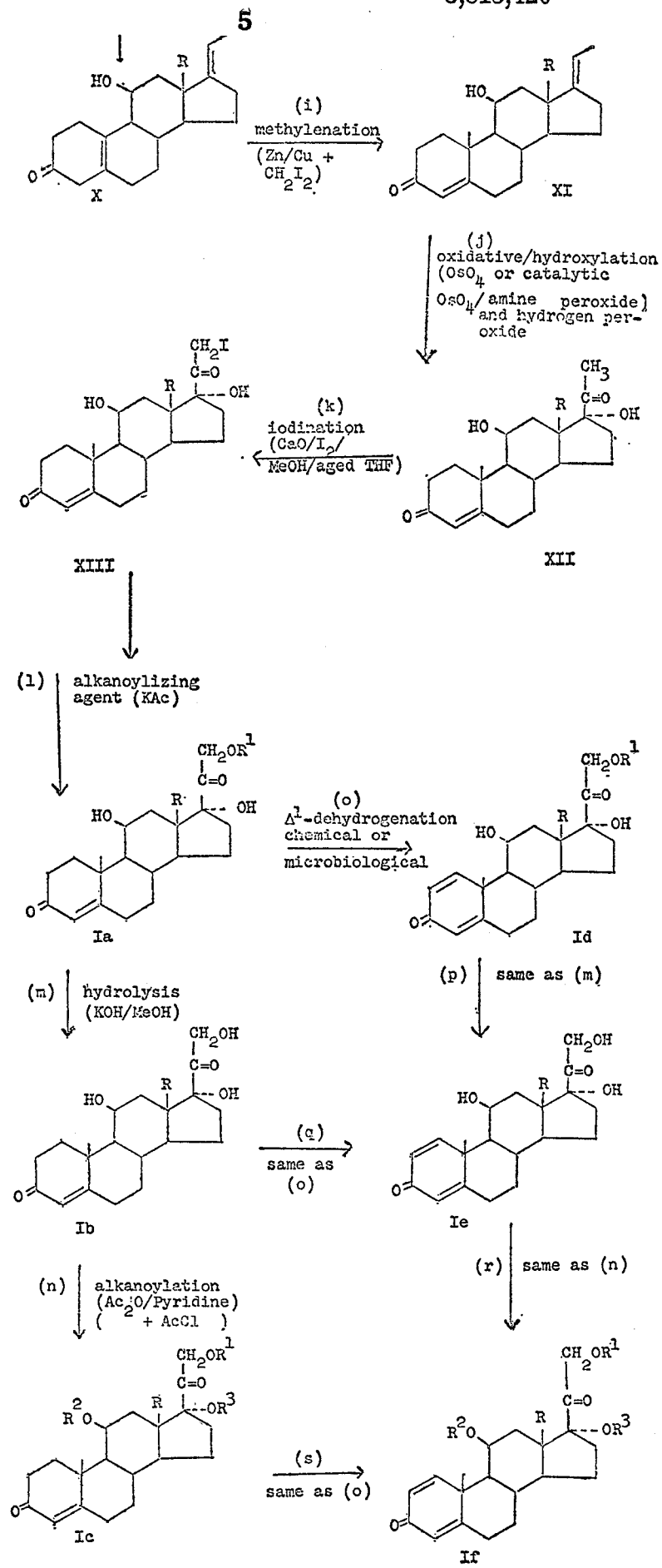

wherein R is polycarbon(lower)alkyl, $R^1$, $R^2$ and $R^3$ are (lower)alkanoyl and $R^4$ is (lower)alkyl. Illustrative reagents for effecting the various steps are shown parenthetically—they are not limiting; obvious chemical equivalents may be used also.

This invention also contemplates and provides a useful alternative route from XII to Ia–f (inclusive) which is shown in the following *second* pathway:

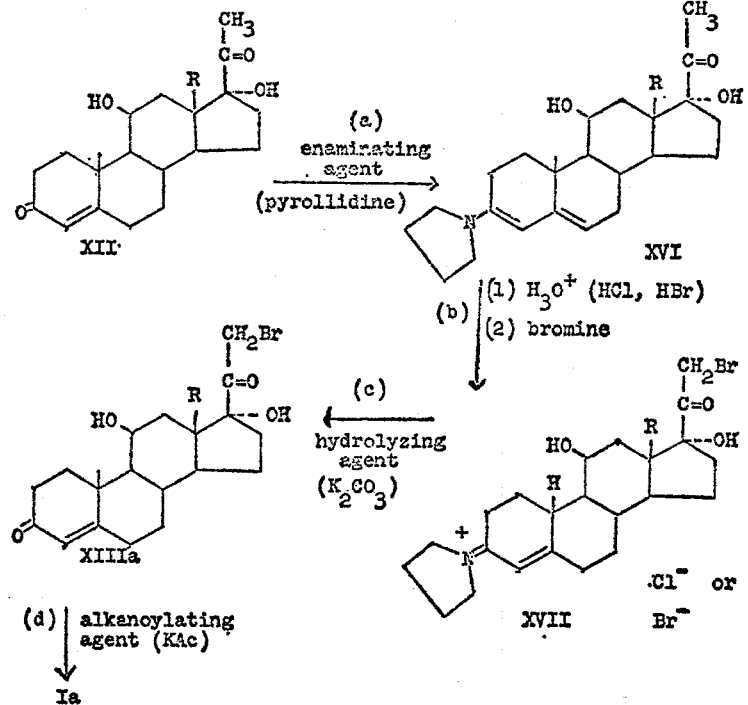

wherein R is polycarbon(lower)alkyl.

In the first pathway, step (a), the compound 13-alkyl-17α-ethyl-3-alkoxygona-1,3,5(10),8-tetraen-17-ol (II) is treated with an organic peracid then with an acid to afford the corresponding 13-alkyl-17α-ethyl-3-alkoxygona-1,3,5(10),8-tetraen-11-on-17-ol (III). In one manner of proceeding the steroid is suspended in an inert organic diluent, e.g., benzene, ether, halogenated hydrocarbons, such as chloroform, and treated with an organic peracid, e.g., perbenzoic acid, monoperphthalic acid, performic acid or, preferably, m-chloroperbenzoic acid by adding the peracid portionwise at low to moderate temperatures, i.e., 0–35° C., but preferably about 20° C., during from about 0.5 to about 5 hours, preferably about 1 hour. The reaction mixture is stirred for about an additional hour then washed free from acid and then the diluent is removed. The residue is dissolved in an alcohol, e.g., methanol and treated with an excess of acid, e.g., 6 N hydrochloric acid. After about three hours at about 20° C. the reaction is complete. The product (III) can be recovered, for example, by cooling the mixture, e.g., to about 0° C. and filtering off the precipitated compound, which can be purified, if desired, by recrystallization from an appropriate solvent, such as a mixture of methanol and ethanol.

In step (b), compound (III) is treated with an alkali metal, such as sodium, potassium or lithium, or an alkaline earth metal, such as calcium, in an amine, such as liquid ammonia or triethylamine to afford the corresponding 13 - alkyl-17α-ethyl-3-alkoxygona-1,3,5(10)-trien-11-on-17-ol (IV). The use of lithium in liquid ammonia is preferred. In one manner of proceeding compound (III) is dissolved in an appropriate inert solvent, e.g., tetrahydrofuran (THF) and added to distilled liquid ammonia. Enough lithium metal is added to insure that an excess is present (blue color persists after 10 minutes) and the reaction then is considered complete. The product (IV) is recovered by adding an excess of glacial acetic acid then hot water to boil off the ammonia and precipitate the organic compound. This is recovered by extraction with benzene and ether and washing, drying and evaporating the extract to leave IV as a residue. Purification is effected, if desired, by trituration with hot methanol.

In step (c) compound (IV) is reacted with a suitable hydride-transfer agent such as a borohydride or an alkali metal alumino hydride, e.g., lithium aluminum hydride to afford 13-alkyl-17α-ethyl-3-methoxygona-1,3,5(10) - trien-11β,17-diol (V). The use of lithium aluminum hydride or sodium borohydride is preferred. In one manner of proceeding compound (IV) is dissolved in a suitable inert organic solvent, e.g., THF and added to a mixture of lithium aluminum hydride in an inert medium, e.g., ether. Enough additional solvent, e.g., THF, to make the mixture homogeneous is added, if required. The reaction is facilitated by heating, preferably to reflux, e.g., about 65° C. if THF is used, but lower depending on the amount of ether present. After from about 1.5 to about 10 hours, excess hydride is decomposed, e.g., by adding methanol, then water and any precipitated inorganic salts are removed, e.g., by filtration. Drying and evaporation of the organic layer leaves V as a residue, and this may, if desired, be purified by recrystallization from a solvent, such as a (lower)alkanol, e.g., methanol.

In step (d), compound (V) is reacted with an alkanoylating agent, such as an acyl halide, acid anhydride or ester of the acylating acid with a lower alkanol, and preferably aceticanhydride, under selective alkanoylating conditions, e.g., in the presence of a base, e.g., pyridine, at temperatures of from about 75–150° C., preferably about 90° C. to produce a 13-alkyl-17α-ethyl-3-alkoxygona-1,3,5(10)-trien-11β,17-diol, 11 - (lower)alkanoate (VI). In one manner of proceeding, compound (V) is suspended in acetic anhydride and pyridine and the mixture is heated to 90° C. for about 6 hours, then cooled to about 25° C. and stirred for about an additional 16 hours. The product (VI) is recovered by slowly adding a lower alkanol, e.g. methanol, to the mixture, then diluting with a water-immiscible organic solvent, e.g., a mixture of ethyl acetate and benzene, then washing and drying the organic layer, e.g., first with dilute acid (10% HCl), then with dilute base (NaHCO₃), finally anhydrous sodium sulfate. Evaporation of the organic layer leaves (VI) as a residue and it may, if desired, be purified by recrystallization from a lower alkanol, e.g., methanol.

In step (e) compound (VI) is reacted with a dehydrating agent to produce 13-alkyl-3-alkoxy-18,19-dinorpregna-1,3,5(10),17(20)-tetraen - 11β - ol, 11-(lower)alkanoate (VII). Suitable reagents for the dehydration process are thionyl chloride in pyridine, phosphorus oxychloride, p-toluene sulfonic acid or strong acids, such as sulfuric acid and perchloric acid; phosphorus oxychloride is preferred. In one manner of proceeding, compound (VI) is refluxed in a basic medium, e.g., pyridine with phosphorus oxychloride for from about 0.5 to about 10 hours, preferably about 1.5 hours. The product (VII) can be recovered by cooling the mixture, pouring it onto ice and extracting the organic material into a water immiscible organic solvent, e.g., ether. Washing (with dilute acid, e.g., 10% HCl, base, e.g., dilute NaHCO₃ and brine) then drying and evaporating the solvent provides the product (VII) as a residue, and it can be recrystallized, e.g., from a lower alkanol such as methanol, if desired.

In step (f) compound (VII) is reacted with an agent, such as an alkali metal hydroxide or an alkali metal alumino hydride to remove the protective (lower)alkanoyl group and produce 13-alkyl-3-alkoxy-18,19-dinorpregna-1,3,5(10),17(20)-tetraen-11β-ol (VIII). Preferred agents to affect the removal in this step are methanolic sodium hydoxide or lithium aluminum hydride. In one manner of proceeding, the steroid (VII) is dissolved in an inert solvent, e.g., ether and added to lithium aluminum hydride in a solvent, e.g., ether. The reaction mixture is refluxed from about 1 to about 10 hours preferably about 3 hours, then THF and then water is added. A small amount of base, e.g., 10% NaOH and more water are added, inorganic solvents are removed, e.g., by filtration and the product (VIII) is recovered by washing the organic layer with brine, drying and evaporating to leave (VIII) as a residue. The product can be purified, if desired, by recrystallization from a lower alkanol, e.g., methanol.

In step (g) compound (VIII) is reacted with an alkali metal/amine/alcohol combination, i.e., a so-called Birch reduction, to produce 13-alkyl-3-alkoxy-18,19-dinorpregna-2,5(10),17(20)-triene-11β-ol (IX). Examples of suitable metals are potassium, lithium, calcium, and sodium and, preferably, lithium is selected. The alcohol suitably has up to 6 carbon atoms and is preferably ethanol. The amine is suitably ammonia or a (lower)alkylamine and is preferably liquid ammonia. In one manner of proceeding, compound (VIII) is dissolved in THF and the solution is added to about 3 parts by volume of liquid ammonia. A small amount of ethanol is added, followed by lithium metal and the mixture is stirred for from about 0.5 to about 6 hours. At the end of this period, ethanol is added to discharge the blue color and the product (IX) is recovered, first by adding water, then extracting with a water-immiscible organic solvent, such as a mixture of ether and benzene. Washing, drying and evaporating of the organic solvent layer affords compound (IX) as a residue, and it can be purified, if desired, for example, by trituration with ether.

In step (h) compound (IX) is reacted with a mild hydrolysis agent, i.e., a weak acidic hydrolysis agent, e.g., oxalic acid to produce 13-alkyl-18,19-dinorpregna-5(10),17(20) - dien - 3 - on - 11β-ol (X). In one manner of proceeding, compound (IX) is suspended in methanol and oxalic acid dihydrate is added and the mixture is stirred at about 25° C. until solution is complete. Water then is added in the mixture and stirred for from about 0.5 to about 3 hours. The product (X) is recovered, for example, by adding water and extracting with a water-immiscible organic solvent, e.g., ether. Washing, drying and evaporating the extract leaves the product as a residue. This can be recrystallized, if desired from ether.

In step (i) compound (X) is reacted with a methylenating agent, i.e., ICH₂·ZnI, prepared by reacting zinc/copper couple with methylene iodide (the so-called "Simmons-Smith" reagent) to produce 13-alkyl-18-norpregna-4,17(20)-dien - 3 - on - 17β - ol (XI). In one manner of proceeding, the Simmons-Smith methylenation reagent is prepared by adding ether to a zinc-copper couple (under nitrogen) then a few drops of methylene diiodide and a crystal of iodine to start the reaction. Then more methylene diiodide in ether is added during about 0.5 hours and finally the mixture is refluxed for about four hours to complete the reaction. Before use, 1,2-dimethoxyethane may be added to complex with excess zinc iodide [see, H. E. Simmons and R. D. Smith, J. Am. Chem. Soc., 80, 5323 (1958)]. To the reagent, compound (X) is added quickly as a solid, the mixture is refluxed, preferably under nitrogen for about 20 minutes then cooled and poured into water. The organic layer is separated, washed with weak base, e.g., bicarbonate, brine and dried. Evaporation to dryness and chromatography of the residual oil provides the product (XI).

In step (j) compound (XI) is reacted with an oxidative/hydroxylation agent to produce a 13-alkyl-18-norpregn-4-en-3,20-dione-11β,17α-diol (XII). Suitable agents are osmium tetroxide or catalytic amounts of osmium tetroxide together with an amine oxide peroxide, such as triethylamine oxide/hydrogen peroxide complex and, preferably, N-methyl morpholine oxide peroxide. In one manner of proceeding, a suitable amine oxide peroxide solution is prepared by adding 90% hydrogen peroxide to a solution of N-methyl-morpholine in an inert solvent, e.g., t-butanol and stirring the mixture at about 25° C. for about 16 hours. The solution is dried for at least about 1 hour over anhydrous calcium sulfate and the desiccant is filtered off of the "peroxide reagent." The compound to be oxidatively-hydroxylated (XI) is dissolved in dry t-butanol containing pyridine. A small amount of osmium tetroxide [e.g., about 1 part by weight per 60 parts by weight of (XI)] is added, the mixture is stirred briefly and the "peroxide reagent" is added. The mixture is stirred until the reaction is substantially complete—it is convenient to measure this by determining the disappearance of starting material (XI) from aliquots of the reaction mixture by thin layer chromatography (TLC). The product (XII) is recovered by concentration in vacuo to about one-half or one-third volume, and adding 5% aqueous sodium sulfite. After stirring for about one hour more, water is added and the mixture is extracted with a water-immiscible organic solvent, such as ether. After washing the organic extracts with base, e.g., 50% NaOH, dilute acid, e.g., dilute HCl, weak base, e.g. NaHCO₃ and brine, evaporation affords the product (XII) as a residue. It can be purified, if desired, by chromatography, e.g., on neutral alumina.

In step (k) compound (XII) is reacted with an iodinating agent to produce a 13-alkyl-21-iodo-18-norpregn-4-en-3,20-dione-11β,17α-diol (XIII). A useful and preferred reagent system to accomplish this comprises iodine and calcium oxide in a lower alkanol, e.g., methanol and THF (either aged and containing peroxides or to which a peroxide, e.g., tert. butyl hydroperoxide, has been added). A useful reaction temperature range is from about 20° C. to about 40° C. for a period of from about 1 to about 5 hours. In one manner of proceeding, compound (XII) is dissolved in THF and methanol (about 1.5:1 to about 3.0:1 THF/MeOH). The THF should be old and contain traces of peroxides or else enough t-butyl hydroperoxide should be added to be equivalent to 0.006 to 0.018 g. iodine/ml. THF. The mixture is stirred at about 23° C. with calcium oxide, e.g., from about 4 to 6 molar equivalents and iodine, e.g., from about 1.5 to 2 molar equivalents, for about 2.5 hours, during which time the iodine color mostly disappears, then the solid is filtered off. The product (XIII) may be isolated by diluting the filtrate with methylene chloride, washing with aqueous Na₂S₂O₇ then with water and drying. Evaporation leaves (XIII) as a residue, sufficiently pure to be used in the next step.

In step (1) compound (XIII) is reacted with an alkanoylating agent, which replaces the iodine atom with an alkanoyloxy group to produce a 13-alkyl-18-norpregn-4-en-3,20-dione-11β,17α,21-triol, 21-alkanoate of Formula Ia. Basically, this is a reaction with a sodium or potassium salt of an organic acid and it may be carried out either by direct addition of the sodium or potassium salt to a solution of the iodo steroid or by in situ formation of the salt in the solution containing the steoid. In either event, the reaction is between the iodo steroid and the salt, for example, sodium or potassium acetate, propionate, butyrate, or valerate, and takes place in a lower aliphatic oxygenated solvent containing up to six carbon atoms including esters such as ethyl acetate or ketones such as acetone or methyl isopropyl ketone. The reaction takes place at a temperature of from about 40° C. to about 100° C. during a period of from about 4 to about 48 hours. An excess of salt is generally employed to insure complete reaction of the steroid. It is preferred to effect this step with potassium acetate in acetone at reflux temperatures for about 24 hours. In one manner of proceeding, the steroid is dissolved in dry acetone, potassium acetate is added and the mixture is refluxed for 24 hours. The mixture is cooled, filtered, diluted with methylene chloride and washed with brine. Then the solvents are evaporated and the residue is refluxed in a lower alkanol, with a metabisulfite, or equivalent, salt and a small amount of water. Cooling, diluting with an organic solvent and drying, followed by evaporation leaves product (Ia) a residue. It may, if desired be purified by chromatography or recrystallization.

In the second pathway, step (a), 13-alkyl-18-norpregn-4-en-3,20-dione-11β,17α-diol (XII) is reacted with an enaminating agent to produce an enamine, 11β,17α-dihydroxy-13-ethyl-3-N-pyrrolidino - 19 - norpregna-3,5-dien-20-one (XVI). Compound (XII) is reacted with a primary or secondary amine, preferably a secondary amine in which the nitrogen atom forms part of a 5-membered ring, as in pyrrolidine or substituted pyrrolidines as these form particularly easily. In one manner of proceeding, compound (XII) is dissolved in enough warm methanol to provide a hot, saturated solution, pyrrolidine is added, the mixture is cooled to about 25° C., and after precipitation is substantially complete, the product (XVI) is filtered off.

In step (b) compound (XVI) is reacted with a strong acid then with bromine to produce a 21-bromo-11β,17α-dihydroxy - 13 - alkyl-3-pyrrolidiniminium-18-norpregn-4-en-20-one, acid addition salt. It is preferred to use hydrogen chloride or hydrogen bromide as the strong acid and these provide the chloride and bromide salts of the desired enamines. The bromine can be added then to a suspension of the enamine salt in an inert solvent medium, such as a lower alkanol, e.g., ethanol, preferably at a low temperature, e.g., from about —70° to about 0° C., and especially preferably at about —60° C. In one manner of proceeding, compound (XVI) is suspended in ethanol and treated with a saturated solution of hydrogen chloride in ethanol. After stirring for 10 minutes a solution of bromine in ethanol (prepared at —60° C.) is added until a stable yellow color is obtained. Then the mixture is evaporated to leave the product (XVII) as a residue.

In step (c), compound (XVII) is reacted with a hydrolyzing agent to produce a 21-bromo-11β,17α-dihydroxy - 13 - alkyl-18-norpregn-4-en-3,20-dione (XIIIa). Suitable hydrolyzing agents comprise bases such as alkali metal or alkaline earth metal hydroxides or carbonates or quaternary ammonium hydroxides and especially useful is potassium carbonate. In one manner of proceeding, compound (XVII) is suspended in a mixture of lower alkanol, e.g., ethanol, and water, and potassium carbonate is added. The mixture is stirred for from about 0.5 to about 12 hours, preferably about 1 hour at a temperature of from about 15° C. to about 50° C., preferably about 25° C., then is evaporated to dryness. The residue is extracted with a water-immiscible organic solvent, such as ether, the extract is washed with dilute acid, e.g., dilute HCl, a weak base, e.g., aqueous NaHCO₃, and brine, then dried and evaporated to leave the product (XIIIa) as a residue.

The alkanoylation of step (d) is carried out on (XXXa) to produce the corresponding product (Ia). The procedures and reagents are entirely analogous to those described in detail for the corresponding 21-iodo compound (XIII) and, in addition, will be exemplified in detail hereinafter.

In the embodiment of this invention represented in the first pathway, step (m) aned step (p) compounds (Ia) and (Id), respectively, are reacted with a hydrolyzing agent, such an acid or basic agent, but preferably a basic hydrolyzing agent, to produce the corresponding 13-alkyl - 18 - norpregn-4-en-3,20-dione-11β,17α,21-triol (Ib) and 13-alkyl - 18 - norpregna-1,4-dien-3,20-dion-11β,17α, 21-triol (Ie), respectively. Suitable hydrolyzing agents are dilute mineral acids such as hydrochloric acid or bases such as alkali metal hydroxides or carbonates, e.g., potassium hydroxide, potassium carbonate or lithium carbonate and water in suitable solvent media, such as lower alkanols, e.g., methanol or in dimethylformamide. A preferred hydrolyzing agent is potassium hydroxide in methanol. A second preferred hydrolyzing agent is potassium bicarbonate in an aqueous methanolic medium. In one manner of proceeding compounds (Ia) or (Id) are dissolved in methanol and stirred with potassium bicarbonate in water for about 18 hours at about 25° C. in an atmosphere of nitrogen. The products (Ib) and (Ie) are recovered by extracting the respective mixtures with a water immiscible organic solvent, such as chloroform, washing the organic solution, then drying and evaporating to leave the product as the residue. The products may, if desired, be purified by recrystallization from a suitable solvent, such as, for example, a mixture of acetone and hexane.

In the embodiment of this invention represented in the first pathway, step (n) and step (r), compounds (Ib) and (Ie) are alkanoylated with a (lower)alkanoylating agent to produce the corresponding 13-alkyl-18-norpregn-4-en-3,20-dione - 11β,17α,21 - triol, tri(lower)alkanoate (Ic) and 13-alkyl - 18 - norpregna-1,4-diene-3,20-dione-11β,17α,21-triol, tri(lower)alkanoate (Id), respectively. The alkanoylating agent is suitably a (lower)alkanoyl halide, e.g., acetyl chloride, or a (lower)alkanoic anhydride, e.g., acetic anhydride. The reaction is preferably carried out in the presence of a base, such as aniline, dimethylamine and especially pyridine. A preferred (lower) alkanoylating agent is acetic anhydride in the presence of pyridine. In one manner of proceeding, the steroid (Ib) or (Ie) is allowed to stand in a mixture of acetic anhydride and/or acetyl chloride in pyridine at 25° C. for 48 hours. The product (Ic) or (If) is obtained by pouring the reaction mixture into water, extracting with a water-immiscible solvent, such as ether. The extract is washed, dried and evaporated to leave the product as a residue. It may be purified, if desired, by recrystallization from a lower alkanol, e.g., methanol.

In the embodiments of this invention represented in the first pathway, steps (o), (q) and (s), compounds (Ia), (Ib) and (Ic) are dehydrogenated at —$C_1$—$C_2$— to introduce a double bond and produce the corresponding 13-alkyl - 18 - norpregnadiene-3,20-dione-11β,17α,21-triol, and (lower)alkanoates, (Id), (Ie) and (If) respectively. Delta-1-dehydrogenation may be effected chemically or microbiologically. For example, the compound can be dehydrogenated with (a) the dehydrogenating activity of a microorganism; (b) selenium dioxide; (c) dichlorodicyanoquinone (DDQ); (d) first formation of a glyoxalate residue at C–2, brominating at C–2, then elimination of the bromine with simultaneous cleavage of the glyoxalate residue; or an obvious equivalent of any of these.

For the chemical conversion, the compound is treated with selenium dioxide in an inert solvent, i.e., a solvent which is inert to the reagent selenium dioxide, as well as non-injurious to the steoid compound and product. Solvents which are useful for this reaction include, for example, tertiary butanol, tertiary pentanol, benzene, ethylene glycol and various other glycol ethers, phenetole, xylene, dioxane and naphthalene. It will be noted that various high boiling alcohols, ethers and hydrocarbons may be utilized for the reaction.

In carrying out the reaction, it is generally preferred to utilize temperatures of from about 75° C. to about 200° C. for from about 1 hour to about 100 hours. If the solvent that is chosen is not sufficiently high boiling so that the desired elevated temperature, which assures reasonably rapid reaction is obtained, on heating to reflux at atmospheric pressure, then the mixture of solvent, steroid and selenium dioxide is subjected to elevated pressures so that the desired elevated temperature can be realized.

From one to ten molar equivalents of selenium dioxide is employed and it may be added in several different portions during the course of the reaction.

Preferred conditions include the addition of a lower fatty acid such as acetic acid to a tertiary butanol mixture.

The product is isolated in accordance with standard means after filtering the reaction mixture to remove solid residual material. The mixture may be simply evaporated in vacuo to leave the desired product as a residue which is then purified by recrystallization of chromatography. Alternatively, the filtrate may be washed with various reagents designed to remove residual impurities before it is evaporated. This procedure is illustrated in the examples.

If dichlorodicyanoquinone (DDQ) is to be used, the reaction quantities, i.e., from about 1 to about 10 molar equivalents, the inert solvents, the temperatures, i.e., from about 75° C. to about 200° C.; the period, i.e., from about 1 to about 100 hours and the work-up and recovery procedures are generally the same as described for $SeO_2$. However, an especially preferred manner of proceeding is to reflux the compound in dioxane with DDQ under nitrogen for about 2 hours. The mixture is cooled, diluted with ether and washed with a base, i.e., 5% NaOH, then brine, dried and evaporated to leave the product (Id-f) as a residue. This may, if desired, be purified, for example, by chromatography.

A preferred method comprises glyoxalation, bromination and elimination of the bromine with simultaneous cleavage of the glyoxlate residue. This is effected by reaction of the compound with a di(lower)alkyl oxalate, e.g. dimethyl oxalate and an alkali metal (lower)alkoxide, e.g., sodium methoxide, in an inert solvent, e.g., benzene, at a temperature of from about —5° C. to about 50° C. for a period of from about 2 to about 24 hours, followed by bromine in an inert organic solvent, e.g., $CCl_4$, at a temperature of from about —10° C. to about 15° C. for a period of from about 15 minutes to about 8 hours, followed by an alkali metal carbonate, e.g., lithium carbonate, and an alkali metal halide, e.g., lithium bromide, in an inert organic solvent, e.g., dimethylformamide, at a temperature of from about 75° C. to about 200° C. for a period of from about 1 to about 100 hours. In one manner of proceeding, the steroid is added to a cooled mixture of dimethyl oxalate in benzene containing sodium methoxide. The mixture is stirred at 0° C. for about 3 hours, then about 12 hours at about 25° C. Water and ether are added and the mixture is extracted with 5% NaOH. The aqueous extract is acidified and the intermediate is recovered by ether extraction. It is dissolved in methanol, treated with potassium acetate, cooled to —5° C. and bromine in carbon tetrachloride is added dropwise. The mixture is allowed to come to about 25° C., water is added and the mixture is extracted with ether. The residue remaining after evaporation of the ether is heated with lithium carbonate and lithium bromide in DMF at 120° C. for 8 hours. The product is recovered by cooling the mixture, adding water and extracting with ether. Evaporation of the ether leaves the corresponding products (wherein $R^1$, $R^2$ and $R^3$ are hydrogen) as a residue. These may, if desired be purified by chromatography.

If a microbiological method is selected for introducing the double bond at the 1,2-position, a number of organisms are available. There may be mentioned by way of example, *Corynebacterium simplex* as described by Bernstein et al., in the Journal of the American Chemical Society, 78, 5693 (1956), and organisms of the genus Mycobacterium as described in U.S. Pat. 2,905,592, issued on Sept. 22, 1959. Particularly useful are organisms of the genus Nocardia including, for example, *Nocardia opaca* and *Nocardia globerula*. The steroid is subjected to the oxidizing, that is, the dehydrogenating activity of the selected organism. There are several procedures which may be used for the dehydrogenation. In the first of these, nutrient media are seeded with slants of the selected organism. Such a medium may consist, for example, of a mixture of standard bacteriological nutrient broth base, together with added carbohydrate. The cultivation of the various organisms in accordance with this procedure has been described in considerable detail in many publications. The seeded, sterile, nutrient solutions may be grown in shake flasks for two to three days to provide inoculum for larger vessels and in turn, the larger, stirred, aerated vessels may be used for the inoculation of full production scale vessels for submerged fermentation. The same medium of the type described above may be used for the large scale dehydrogenation of steroids according to this process. Considerable variation may, of course, be made in the medium. In general, there is required a carbohydrate, a source of organic nitrogen, mineral salts and various trace metals.

Rather than conducting the dehydrogenation in the presence of the whole fermentation broth, the cells may be removed from growing cultures and these may be resuspended in a medium which is designated the enzyme reaction mixture. Such a mixture may consist, for example, of a solution which is 0.01 molar in sodium fumarate or other hydrogen acceptor or in magnesium sulfate and 0.03 molar in sodium citrate. The presence of a certain amount of adenosine triphosphate, for example, 0.125% is also quite useful. Centrifuged, washed cells of the chosen organism may be suspended in this type of reaction mixture which is adjusted to a pH of about 6, for example, with citric acid. After addition of the steriod compound which it is desired to oxidize, the mixture may be incubated at about 37° C. and samples may be removed from time to time to determine the point at which maximum conversion of the steroid has taken place. In general, this occurs after about one to several days. The cells from about 100 ml. of the stirred, aerated cultures may be suspended in about 20 ml. of an enzyme reaction mixture for suitable results. Considerable variation may be made in these proportions. The steroid compound may be used in a proportion of about 25 to about 200 mg./ml. of the enzyme reaction mixture. The compound in solid form is merely added to the medium after adjustment of the pH. The flasks are stoppered with cotton so that they are exposed to the air during the incubation. It is prefered to use a small volume compared to the volume of the flask, for example, 20 ml. in a 125 ml. Erlenmeyer flask. Alternatively, the mixture may be stirred and aerated. In general, a hydrogen acceptor, a divalent metal, particularly magnesium and a buffer are required in the medium.

Rather than removing the cells and carrying out the reaction in an enzyme reaction mixture, the steroid compound may be added directly to a sterilized portion of the nutrient medium such as is described above and the medium is then seeded with the chosen organism. Approximately, the same proportion of chosen steroid compound may be used in this case also. Samples of the agitated aerated mixture may be removed at intervals for determination of the conversion of the steroid compound to the oxidized products. The mixture is maintained at between 20° C. and 37° C. or higher during the growth of the cells and the conversion of the steroid. In general, about one-half to seven days are required for maximum production of the dehydrogenated compounds. Alternatively, the growth of cells may be established before the addition of the steroid.

A third method which is also very useful for the dehydrogenation of the substrate involves the use of oxidizing enzymes produced by the organism. These may be prepared by a variety of methods from the cells of the organism. These materials may be released from the cells by different procedures. These include grinding, particularly with abrasive materials such as powdered glass or sand which serves to break the cell walls and release the essential materials. A second method is by autolysis. The cells may be removed from the medium in which they are grown. They are then washed and suspended in water. The water may be covered with a thin layer of toluene to prevent contamination, and the mixture is allowed to stand at a temperature of from about 20° C. to about 50° C. The cells disintegrate within one to several days and the cell residue may be removed by filtration, for example, through a Seitz filter or through a sintered glass bacterial filter. A third method for preparing cell-free elaboration products of an organism used for dehydrogenation is by repeated, rapid freezing and thawing of the cellular material. Another method is by the use of ultrasonic energy to rupture the cells. One further method of use for the same purpose is by the use of a water miscible solvent, particularly acetone. The cells when placed in such a solvent are ruptured and an extract of the desired enzymes is obtained. The enzymes may be used for dehydrogenation in media, similar to those used with the grown cells, that is, one containing a hydrogen acceptor such as fumarate, a buffer and in some cases, a bivalent metal, particularly, magnesium as well as a minor proportion of adenosine triphosphate. The cell-free oxidizing enzymes of the organism may be used in media indicated above at a temperature of about 20° C. to about 40° C. In general, the oxidation of the desired steroid compound is brought about in a period of from a few hours to several days. The optimum time and temperature and other conditions may readily be determined by a minimum of experimentation. Detailed descriptions of suitable media for both the use of isolated, resuspended cells and of cell-free elaboration products are given in the textbooks Manometric Techniques in Tissue Metabolism by W. W. Umbreit et al., Burgess Publishing Company, Minneapolis (1949), and Respiratory Enzymes by H. Lardy, Burgess Publishing Company, Minneapolis (1949).

The products may be isolated by known methods, for example, by extraction with various water immiscible organic solvents. Lower halogenated hydrocarbons such as chloroform are particularly useful. After extraction, the solvent may be removed by distillation and the solid product then isolated. Further purification may be affected by recrystallization from suitable organic solvents, for example, ethyl acetate. Chromatographic methods employing paper, alumina or other suitable solid absorbent materials can also be used.

Preferred materials in all of the above pathways are those wherein R is ethyl; $R^1$, $R^2$ and $R^3$ are hydrogen or acetyl and $R^4$ is methyl.

Contemplated by this invention as valuable intermediates are compounds of Formulae XI, XII, XIII and XIIIa, XVI and XVII.

Starting materials for the above pathways, i.e., the 13-alkyl-17α - ethyl - 3 - alkoxygona-1,3,5(10),8-tetraen-17-ols (II) can be prepared by the methods described in G. A. Hughes and H. Smith, U.S. Ser. No. 467,419, filed June 28, 1965, now allowed.

The time and temperature ranges used in describing the aforementioned process steps simply represent the most convenient ranges consistent with carrying out the reaction in a minimum of time without undue difficulty. Thus reaction temperatures appreciably below these can be used, but their use considerably extends the reaction time. Similarly, reaction temperatures higher than those mentioned can be employed with a concomitant decrease in the reaction time, although purity of the product may be somewhat decreased.

The sources for the starting materials of Formula II have been specified hereinabove. All can be prepared by totally synthetic processes described by Douglas, Graves, Hartley, Hughes, McLoughlin, Siddall and Smith in J. Chem. Soc., 1963, pp. 5077–94. In the product of a total synthesis which has not included a suitable resolution stage the compounds of this invention will be present as racemates. Using a convention approved by Fieser and Fieser, "Steroids," p. 336 (1959), the compounds designated as the d-forms are the enantiomers corresponding in configuration at C–13 to that of the natural hormone estrone. The corresponding enantiomorphs are consequently designated the l-forms and the racemates the dl-forms. Racemates will be depicted by structural formulas which show only the enantiomorphs of the d-configuration.

As is mentioned hereinabove, the compounds of Formula I have mineralocorticoid properties, coupled with a lack of salt retention. This makes them of value to alleviate experimentally induced edemae in laboratory animals, such as rats and inflammations and collagen diseases in valuable domestic animals, such as cows and dogs.

This invention in one of its embodiments provides pharmaceutical compositions comprising a compound of Formula I and a pharmaceutically-acceptable carrier. They can be formulated in liquid or solid forms, for instance as capsules, tablets, suppositories, powders, dispersible granules, cachets and the like by combining them with conventional carriers. Such conventional carriers include magnesium carbonate or stearate, talc, sugar, lactose, pectin, dextrin, starch, gelatin, tragacanth, methyl cellulose, sodium carboxymethyl cellulose, low melting wax and cocoa butter. Diluents, flavoring agents, binders or tablet-disintegrating agents can be used. Powders or tablets preferably contain 5 or 10 to 99% of the active constituent. The active steroid can be formulated with an encapsulating material with or without other carriers.

Liquid preparations such as solutions, suspensions or emulsions can be used. Such preparations include dispersions in a pharmaceutically-acceptable carrier such as arachis oil or sterile water, preferably containing a non-ionic surface active agent such as fatty acid esters of polyhydroxy compounds, e.g., sorbitan, aqueous starch in sodium carboxymethylcellulose solutions, aqueous propylene glycol or polyethylene glycol. Thus a water-propylene glycol solution can be used for parenteral injection and aqueous suspensions suitable for oral use can be made by utilizing natural or synthetic gums, resins, methyl cellulose or other well-known suspending agents.

Compounds of Formula I can also be put up into ointments, salves and the like, by well-known methods, and these are useful for topical application.

The compositions may be in unit dose form in which the dose unit is for instance from about 0.1 to about 200 mg. of each active steroid. The unit dose form can be a packaged composition, e.g., packaged powder, vials or ampules or, for example, capsules, cachets or tablets or any number of these in packaged form. The pharmaceutical compositions can also consist substantially solely of the active steroid when this is in unit dose form. When used for the purposes stated above, the dosage of the compounds will vary with the pharmacological conditions being treated but in general will be in the range established for hydrocortisone acetate [Merck Index, 7th ed., p. 532 (1960)].

Those skilled in the art of steroid chemistry will have little difficulty in visualizing many variations of the above reaction pathways, both so far as the sequence of the steps, and as far as the types of reaction and reagents used, are concerned; such variations are, of course, obvious equivalents of the routes described above.

The nucleus of the penta-oxygenated 18-nor-pregnenes of Formula I can be substituted in any of the positions and by any of the substituents which are well known to steroid chemists. For example, the nucleus can be substituted in the 1, 2, 4, 6, 7, 9 and 16 positions. Examples of suitable substituents are alkyl groups, particularly at positions 6 and 7, for example methyl groups; halogen atoms, for example fluorine or chlorine; alkenyl groups and formyl groups. Also ring D can be a D-homologated ring.

DESCRIPTION OF THE PREFERRED EMBODIMENTS

The following examples are given by way of illustration and are not to be construed as limitations of this invention, variations of which are possible without departing from the scope and spirit thereof.

Example 1.—11$\beta$,17$\alpha$,21-trihydroxy-13-ethyl-18-norpregn-4-ene-3,20-dione, 21-monoacetate (a) 13,17$\alpha$-diethyl-17-hydroxy-3-methoxygona - 1,3,5 (10),8-tetraen-11-one.—13,17$\alpha$-diethyl-17 - hydroxy - 3-methoxygona-1,3,5(10),8-tetraene (II, prepared as described in Ser. No. 467,419, filed June 28, 1965, Example 43, 200 g.) is slurried in benzene (3.5 l.) and m-chloroperbenzoic acid (264 g. of 80% pure material) is added in portions over 1 hour at 20° C. (cooling when necessary). After stirring for a further hour, the mixture is diluted with ether, then washed free from acid with 5% sodium hydroxide solution, then sodium bicarbonate and brine. The aqueous layers are backwashed with chloroform to ensure complete extraction of the steroid.

The combined organic layers are dried (Na$_2$SO$_4$) then evaporated to yield a solid residue which is dissolved in methanol (1.2 l.) and treated with 6 N hydrochloric acid (300 ml.).

After stirring for 3 hours, the mixture is cooled to 0° C. then filtered. The residue is washed with methanol/water (3:1).

This crude material is crystallized from methanol/ethanol to give the produccct (80.8 g.), M.P. 193–196° C. A further 33.2 g. is recovered from the mother liquors, M.P. 191–195° C.

(b) 13,17$\alpha$-diethyl-3-methoxygona-1,3,5(10)-trien-17-ol-11-one.—13,17$\alpha$-diethyl-17-hydroxy-3-methoxygona - 1, 3,5(10),8-tetraen-11-one (50.0 g.) is dissolved in 1750 ml. of THF and added to distilled liquid ammonia.

Lithium metal (2.05 g.) is added, and after ten minutes, only a faint blue color remains. Acetic acid (25 ml.) is then added rapidly by pipet, then the mixture is worked up by adding hot water until the contents of the flask reach room temperature.

Extraction with benzene/ether affords (after washing, drying and evaporating the organic extracts) a crude residue which is triturated with hot methanol to give product (34 g.), M.P. 186–192° C.

(c) 13,17$\alpha$-diethyl-3-methoxygona-1,3,5(10)-trien - 11$\beta$, 17-diol.—13,17$\alpha$-diethyl-3-methoxygona-1,3,5(10) - trien-17-ol-11-one (24.7 g.) is dissolved in THF (300 ml.) and added to a mixture of lithium aluminium hydride (4.0 g.) in ether (500 ml.). Addition of THF (ca. 500 ml.) is required to make the mixture more homogeneous. After refluxing for 3 hours, excess hydride is destroyed by addition of methanol, then water. The precipitated aluminum and lithium hydroxides are filtered off, and the organic layer is dried over sodium sulfate. Evaporation of the solvent affords a residue which crystallized from ethanol to give product (17.7 g.), M.P. 158–162° C.

Analytical sample has M.P. 163–164° C. Found: C, 76.50; H, 9.19. C$_{22}$H$_{30}$O$_3$ requires: C, 76.70; H, 9.36.

(d) 13,17$\alpha$-diethyl-3-methoxygona-1,3,5(10)-trien-11$\beta$, 17-diol, 11-monoacetate.—13,17$\alpha$-diethyl-3-methoxygona-1,3,5(10)-trien-11$\beta$,17-diol, 29.5 g., is suspended in acetic anhydride (60 ml.) and pyridine (150 ml.) and heated to 90° C. for 6 hours. After cooling, the solution is stirred about 16 hours. Methanol (25 ml.) is then added, cooling as necessary, and when all reaction ceases the mixture is diluted with ethyl acetate/benzene and washed with 10% HCl, bicarbonate and brine.

Evaporation of the organic layer affords a solid which crystallizes from MeOH to give product (22.38 g.), M.P. 193–198° C.

(e) 13-ethyl-11$\beta$-hydroxy-3-methoxy-18,19 - dinorpregna-1,3,5(10),17(20)-tetraen acetate.—13,17$\alpha$-diethyl - 3-methoxygona-1,3,5(10)-trien-11$\beta$,17-diol, 11-monoacetate (22.35 g.) is refluxed with pyridine (100 ml.) and phosphorus oxychloride (22 ml.) for 1½ hours. The mixture is cooled, poured onto ice and extracted with ether. The ether extracts are washed with 10% HCl, bicarbonate and brine and then dried over Na$_2$SO$_4$. Evaporation of the solvent affords the title compound, which is crystallized from methanol to give 16.0 g., M.P. 150–155°C.

(f) 13-ethyl-11$\beta$-hydroxy-3-methoxy-18,19 - dinorpregna-1,3,5(10),17(20)-tetraene.—The acetate of the material of step (e) (16.0 g.) is dissolved in ether (600 ml.) and added to 1.6 g. lithium aluminum hydride in ether (200 ml.). After refluxing for 3 hours, THF (400 ml.) is added, then water (1.5 ml.) 15% NaOH (1.5 ml.) and a further 4.5 ml. water. The hydroxides are filtered off, and the organic layer is washed with brine, dried and stripped in vacuo. The resulting solid is crystallized from ethanol to give the product (11.67 g.), M.P. 122–125° C.

(g) 13-ethyl-11$\beta$-hydroxy-3-methoxy - 18,19 - dinorpregna-2,3,5(10),17(20)-triene.—13-ethyl-11$\beta$ - hydroxy-3-methoxy-18,19-dinorpregna-1,3,5(10),17(20) - tetraene (11.65 g.) is dissolved in THF (500 ml.) and added to liquid ammonia (1500 ml.). Ethanol (2.0 ml.) is added, followed by lithium metal (100 g.) and the mixture is stirred for 1 hour. Ethanol is added dropwise over 30 minutes until the blue color is discharged.

The mixture is worked up by addition of water and extraction with ether/benzene. The organic extracts are washed with brine and dried (Na$_2$SO$_4$) and evaporation of the solvent, followed by trituration with ether affords product as a crystalline solid (9.85 g.), M.P. 119–125° C. IR shows 2.93, 5.96 and 6.07$\mu$. No selective UV absorption above 220 m$\mu$.

(h) 13-ethyl-11$\beta$-hydroxy-18,19-dinorpregna - 5 - (10), 17(20)-dien-3-one.—13-ethyl-11$\beta$-hydroxy - 3 - methoxy-18,19-dinorpregna-2,5(10),17(20)-triene (9.80 g.) is suspended in methanol (500 ml.). Oxalic acid dihydrate (9.80 g.) is added and the mixture stirred until solution is complete. Water (100 ml.) is then added, and the mixture stirred another hour. Then work-up is concluded by addition of an excess of water followed by three ether extractions. The organic extracts are washed and dried, and evaporated to dryness. The residue crystallizes from ether to give the title compound (6.81 g.), M.P. 154–159° C. IR 2.93, 5.88$\mu$.

(i) 13$\beta$-ethyl-11$\beta$-hydroxy-18-norpregna - 4,17 - (20)-dien-3-one.—Zinc-copper couple (3.0 g.) is placed in a 100 ml. flask under an atmosphere of nitrogen. Ether (5 ml.) is added and a few drops of methylene diiodide, then a crystal of iodine to start the reaction. A further amount of methylene iodide (3.7 ml.) is added in ether (50 ml.) over a period of half an hour. The mixture is refluxed for a further four hours, by which time the contents of the flask are distinctly copper colored. 1,2-dimethoxyethane (5 ml.) is then added to complex with excess zinc iodide, and after 30 minutes, 13-ethyl-11β-hydroxy-18,19-dinorpregna-5(10),17(20)-dien-3-one (300 mg.) is added quickly as a solid. The resulting mixture is refluxed under nitrogen for 20 minutes then cooled and poured into water. The ether phase is washed with bicarbonate, brine and dried ($Na_2SO_4$), then evaporated to dryness. Chromatography of the residual oil affords the title compound (30 mg.), M.P. 155–157° C. IR 2.92 and 6.02μ.

UV $\lambda_{max.}^{EtOH}$ 240 mμ (15,300).

(j) 11β,17α-dihydroxy-13-ethyl-18-norpregn-4-en-3,20-dione.—Prepare the reagent as follows:

Add 90% hydrogen peroxide (6.2 ml.) to a solution of N-methylmorpholine (11.5 g.) in t-butanol (95 ml.) and stir overnight. Dry the solution with calcium sulfate (25 g.) for at least 1 hour then filter off the desiccant to obtain a 2.4 to 2.9 N solution.

Dissolve 13β-ethyl-11β-hydroxy-18-norpregna-4,17(20)-dien-3-one (3 g.) in dry t-butanol containing pyridine (4 ml.). Add osmium tetroxide (ca. 50 mg.), stir briefly then add the above peroxide reagent (13–15 ml. according to normality). Stir the mixture until an aliquot sample shows little or no starting material by thin layer chromatography (approximately 24 hours). Concentrate the mixture in vacuo to one-half to one-third volume; then add 5% sodium sulfite solution (70 ml.) and stir for 1 hour. Dilute with water and extract thoroughly with ether. Wash the combined organic extracts with 50% NaOH, dilute HCl, bicarbonate and brine then evaporate to dryness. Chromatograph the product on Grade III Woelm neutral alumina to obtain the title compound.

(k) 11β,17α-dihydroxy-13-ethyl-21-iodo-18-norpregn-4-en-3,20 dione.—Dissolve 11β,17α-dihydroxy-13-ethyl-18-norpregn-4-en-3,20-dione (200 mg.) in THF (1.64 ml.) and methanol (1.0 ml.). (The THF should be old and contain traces of peroxides.) Stir at room temperature with calcium oxide (0.280 g.) and iodine (0.280 g.). After 2½ hours the iodine color mostly disappears and the solid is filtered off. Dilute the filtrate with methylene chloride and wash with 5% sodium thiosulfate, water and dry over $Na_2SO_4$. Evaporate to dryness to give the crude title compound. Use this for the next stage without purification.

(l) 11β,17α,21-trihydroxy-13-ethyl-19-norpregn-4-en-3,20-dione, 21-monoacetate.—Dissolve the crude 11β,17α-dihydroxy-13-ethyl-21-iodo-18-norpregn-4-en-3,20-dione from the previous step (approximately 240 mg.) in dry acetone (5.0 ml.) and reflux with anhydrous potassium acetate (0.35 g.) for 24 hours. Cool, filter, dilute with methylene chloride and wash with brine. Evaporate the solvent and reflux the residue in methanol (5.0 ml.) with sodium metabisulphite (0.115 mg.) and water (2 ml.) for 1 hour. Cool, dilute with methylene chloride and wash with brine. Dry over $Na_2SO_4$ and evaporate to dryness. Chromatography of the residue yields the title compound.

Example 2.—11β,17α,21-trihydroxy-13-ethyl-18-norpregna-1,4-dien-3,20-dione and 21-monoacetate Dehydrogenate 11β,17α,21-trihydroxy-13-ethyl-18-norpregn-4-en-3,20-dione, 21-monoacetate of Example 1 by one of the following procedures:

(a) Reflux the said acetate (1.00 g.) in dioxane (15.0 ml.) with dichlorodicyanoquinone (900 mg.) under nitrogen for 2 hours. Cool, dilute with ether and wash with 5% NaOH, then brine. Dry over $Na_2SO_4$ and evaporate to dryness. Chromatograph the residue on Woelm Grade III neutral alumina to obtain the product in the form of its 21-monoacetate.

(b) Add the said acetate of Example 1 (1.00 g.) to a cooled mixture of dimethyloxalate (900 mg.) benzene (1.0 ml.) and sodium methoxide (420 mg.) and stir at 0° C. for 3 hours, then overnight at room temperature. Add water and ether and extract with 5% NaOH. Acidify the aqueous and extract with ether to give a yellow glass. Dissolve this in methanol (40 ml.) and add potassium acetate (7.0 g.), cool to −5° C. and add a solution of bromine in carbon tetrachloride [3.6 ml. of a mixture of $Br_2$ (1.6 g.) and $CCl_4$ (10 ml.)] dropwise over 15 minutes. Let come to about 25° C. over 3 hours then add water and extract with ether. Evaporation of the ether phase gives a yellow material. Heat this with lithium carbonate (1.8 g.) and lithium bromide (1.8 g.) in DMF (40 ml.) at 120° C. for 10 hours. Cool, filter, add water and extract with ether. Evaporation of the ethereal extract yields a residue. Chromatograph this on Woelm Grade III alumina to give the product in the form of a 21-free alcohol.

Example 3.—11β,17α,21-trihydroxy-13-ethyl-18-norpregn-4-ene-3,20-dione, 21-acetate (alternate procedure)

(a) 11β,17α - dihydroxy-13-ethyl-3 N pyrrolidino-18-norpregna-3,5-dien-20-one.—Prepare a hot saturated solution of 11β,17α - dihydroxy-13-ethyl-19-norpregn-4-en-3,20-dione (Example 1, step (j)) (1 g.) in methanol. Add pyrrolidine (2 ml.) and cool. Filter off the desired enamine.

(b) 21-bromo-11β,17α-dihydroxy - 13 - ethyl-3-pyrrolidiniminium - 18 - norpregn-4-en-20-one, chloride.—Treat 11β,17α - dihydroxy-13-ethyl-3 N pyrrolidino-18-norpregna-3,5-diene-21-one (1 g.) in ethanol (50 ml.) with a saturated solution of HCl in ethanol (2 ml.) and stir for ten minutes. Add a solution of bromine (0.6 g.) in ethanol (20 ml.) (prepared at −60° C.), dropwise until a "permanent" yellow color is obtained. Usually, the whole of the bromine solution will not be required. Evaporate the solution under vacuo below 30° C. Add ether and filter off the title compound. Substitution of hydrogen bromide for hydrogen chloride provides the corresponding bromine.

(c) 21-bromo - 11β,17α - dihydroxy-13-ethyl-18-norpregn-4-en-3,20-dione.—Dissolve 21-bromo - 17α - dihydroxy-13-ethyl-3-pyrrolidiniminium - 18 - norpregn-4-en-21-one, bromide from the preceding experiment (approximately 1.4 g.) in ethanol (120 ml.), water (30 ml.) and potassium carbonate (1 g.). Stir one hour then evaporate to dryness. Extract the residue with ether, wash with dilute HCl, bicarbonate and brine, dry and evaporate to give product.

(d) 11β,17α,21-trihydroxy - 13 - ethyl-18-norpregn-4-ene-3,20-dione, 21-monoacetate.—The procedure of Example 1, step (l), is repeated substituting for the 21-iodo-compound, the corresponding 21-bromo compound of step (c) herein and the product is obtained.

Example 4.—11β,17α,21-trihydroxy - 13 - ethyl-18-norpregna-1,4-diene-3,20-dione, 21 - monoacetate (alternative procedure)

A mixture containing 0.3 g. of 11β,17α,21-trihydroxy-13-ethyl - 18 - norpregn-4-en-3,20-dione, 21-monoacetate and 3.0 ml. of glacial acetic acid in 30 ml. of t-butanol is prepared. To this mixture there is added 0.2 g. of selenium dioxide and the mixture is refluxed in a nitrogen atmosphere for 3 hours. An additional 0.1 g. of selenium dioxide is added and refluxing is continued for 4 more hours. The mixture is filtered and the filtrate evaporated to dryness in vacuo. The residue is taken up in 25 ml. of ethyl acetate and washed with one 5 ml. portion of water, twice with 5 ml. portions of 5% ice cold aqueous 15% ammonium sulfide, once with 5 ml. of cold 2 N ammonium hydroxide, once with 5 ml. portion of water. The layers are separated, the organic layer dried over anhydrous sodium sulfate, filtered and evaporated to dryness in vacuo. The residue is triturated with ether and dried in vacuo to obtain the desired product.

Example 5.—11β,17α,21-trihydroxy-13-ethyl-18-norpregna-1,4-diene-3,20-dione (alternative procedure)

To a four liter Pyrex glass vessel equipped for conducting submerged aerated fermentation there is added two liters of the following medium:

| | Grams |
|---|---|
| Pancreatic digest of casein | 10 |
| Dextrose hydrate | 10 |
| Yeast extract | 5 |
| Calcium carbonate | 1 |

Tap water to make one liter.

The aqueous mixture is sterilized and 0.25 g. of 11β,17α,21-trihydroxy-13-ethyl - 18 - norpregn-4-en-3,20-dione is added. The mixture is then seeded with 100 ml. of a culture of *Nocardia opaca* ATCC 4276 grown in a shake flask on nutrient broth. The mixture is agitated and aerated with sterile air for about 48 hours at 37° C. The broth is then extracted several times with chloroform. The combined extracts are applied to a silica gel chromatography column which is eluted with mixtures of methylene chloride and ethanol. The combined fractions containing the desired product are evaporated to dryness to leave the product as a residue.

Example 6.—11β,17α,21 - trihydroxy - 13 - ethyl - 18-norpregn-4-en-3,20-dione, the Δ¹-dehydro analog, and esters thereof 11β,17α,21-trihydroxy-13-ethyl-18-norpregn - 4 - ene-3,20-dione, 21-monoacetate (0.2 g.) in 100 ml. of methanol is stirred with 0.4 g. of potassium bicarbonate in 60 ml. of water for 18 hours in an atmosphere of nitrogen. The mixture is extracted with chloroform and the organic solution is washed, dried and evaporated. Recrystallization of the residue from acetone-hexane gives the title compound as the 21-free alcohols.

The said 21-free alcohol (0.104 g.) in 0.5 ml. of acetic anhydride, 0.5 ml. of acetyl chloride and 2.5 ml. of pyridine is allowed to stand at 25° C. for 48 hours. The mixture is poured into water, extracted with ether and the extracts are washed, dried and evaporated. The residue is recrystallized from methanol to obtain 11β,17α,21-trihydroxy - 13 - ethyl - 18 - norpregn-4-ene-3,20-dione, 11β,17α,21-triacetate.

The said 21-free alcohol (5 g.) is taken up in 50 ml. of ethylene dichloride containing a 10% molar excess of pyridine. To this mixture there is added a 10% molar excess of propionic anhydride and the mixture is allowed to stand at 20° C. for 16 hours. The mixture is evaporated to dryness and the residue washed with 5% aqueous sodium carbonate. The residue is taken up in 50 ml. of methylene chloride, washed twice with 50 ml. portions of water, dried over anhydrous sodium sulfate, filtered and after removal of the solvent in vacuo there is obtained 11β,17α,21-trihydroxy-13-ethyl - 18 - norpregn-4-ene-3,20-dione, 11β,17α,21-tripropionate.

The said 21-free alcohol (5 g.) together with a 10% molar excess of *n*-hexanoyl chloride in 100 ml. of pyridine is refluxed for 2 hours. The solvent is removed in vacuo and the residue taken up in 50 ml. of methylene chloride. The organic solution is washed twice with 50 ml. portions of 50% aqueous sodium carbonate and then with a 50 ml. portion of water. It is dried over anhydrous sodium sulfate, filtered and after removal of the solvent in vacuo there is obtained 11β,17α-21-trihydroxy-13-ethyl - 18 - norpregn - 4-ene-3,20-dione, 11β,17α,21-tri-*n*-hexanoate.

By entirely analogous procedures, 11β,17α,21-trihydroxy - 13 - ethyl-18-norpregna-1,4-diene-3,20-dione, 21-monoacetate is converted to 11β,17α,21-trihydroxy-13-ethyl-18-norpregna-1,4-diene-3,20-dione; and this, in turn, to 11β,17α,21-trihydroxy-13-ethyl-18-norpregna-1,4-diene-3,20-dione, 11β,17α,21-triacetate; 11β,17α,21-trihydroxy-13 - ethyl - 18-norpregna-1,4-diene-3,20-dione, 11β,17α,21-tripropionate and 11β,17α,21-trihydroxy-13-ethyl-18-norpregna - 1,4 - diene - 3,20-dione, 11β,17α, 21-tri-*n*-hexanoate.

Example 7

The procedure of Example 1 is repeated, substituting in step (a) the following tetraenes (prepared by ethynylating the corresponding 17-ones prepared as described in J. Chem. Soc. *1964*, pp. 4479–4492, then hydrogenating the ethynyl group at atmospheric pressure in benzene in the presence of prereduced 2% palladium on calcium carbonate catalyst):

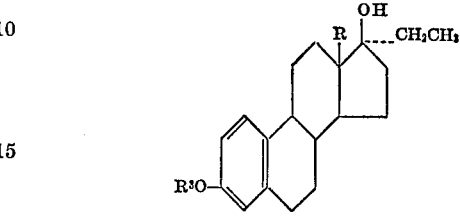

| R: | R⁴: |
|---|---|
| CH₃CH₂CH₂ | CH₃ |
| (CH₃)₂CHCH₂ | CH₃ |
| CH₃(CH₂)₄CH₂ | CH₃ |
| CH₃CH₂ | CH₃(CH₂)₄CH₂ |

There are obtained the following tetraen-11-ones:

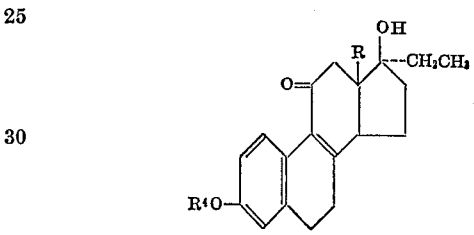

| R: | R⁴: |
|---|---|
| CH₃CH₂CH₂ | CH₃ |
| (CH₃)₂CHCH₂ | CH₃ |
| CH₃(CH₂)₄CH₂ | CH₃ |
| CH₃CH₂ | CH₃(CH₂)₄CH₂ |

These are converted by the procedure of Example 1, step (b) to the following trien-11-ones:

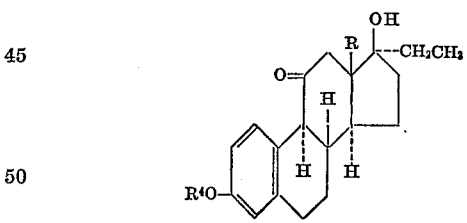

| R: | R⁴: |
|---|---|
| CH₃CH₂CH₂ | CH₃ |
| (CH₃)₂CHCH₂ | CH₃ |
| CH₃(CH₂)₄CH₂ | CH₃ |
| CH₃CH₂ | CH₃(CH₂)₄CH₂ |

These are converted by the procedure of Example 1, step (c) to the following trien-11β-ols:

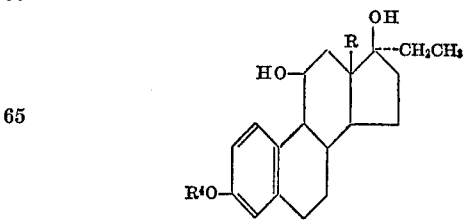

| R: | R⁴: |
|---|---|
| CH₃CH₂CH₂ | CH₃ |
| (CH₃)₂CHCH₂ | CH₃ |
| CH₃(CH₂)₄CH₂ | CH₃ |
| CH₃CH₂ | CH₃(CH₂)₄CH₂ |

These are converted by the procedure of Example 1, step (d) to the following 11β-acetates:

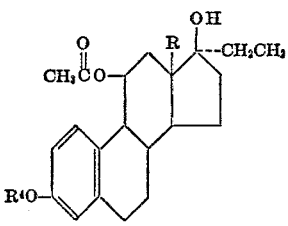

R:
CH₃CH₂CH₂
(CH₃)₂CHCH₂
CH₃(CH₂)₄CH₂
CH₃CH₂

R⁴:
CH₃
CH₃
CH₃
CH₃(CH₂)₄CH₂

These are converted by the procedure of Example 1, step (e) to the following 11β-acetoxy-tetraenes:

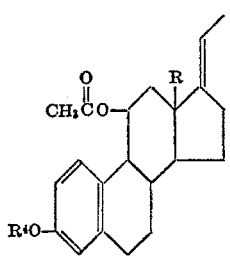

R:
CH₃CH₂CH₂
(CH₃)₂CHCH₂
CH₃(CH₂)₄CH₂
CH₃CH₂

R⁴:
CH₃
CH₃
CH₃
CH₃(CH₂)₄CH₂

These are converted by the procedure of Example 1, step (f) to the following 11β-hydroxytetranes:

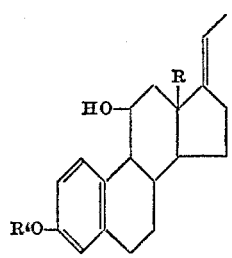

R:
CH₃CH₂CH₂
(CH₃)₂CHCH₂
CH₃(CH₂)₄CH₂
CH₃CH₂

R⁴:
CH₃
CH₃
CH₃
CH₃(CH₂)₄CH₂

If potassium hydroxide in methanol is substituted for LiAlH₄, substantially the same results are obtained. These are converted by the procedure of Example 1, step (g) to the folowing 2,5(10),17(20)-tetraenes:

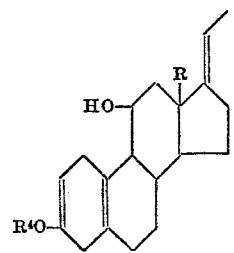

R:
CH₃CH₂CH₂
(CH₃)₂CHCH₂
CH₃(CH₂)₄CH₂
CH₃CH₂

R⁴:
CH₃
CH₃
CH₃
CH₃(CH₂)₄CH₂

These are converted by the procedure of Example 1, step (h) to the following 5(10),17(20) dienes:

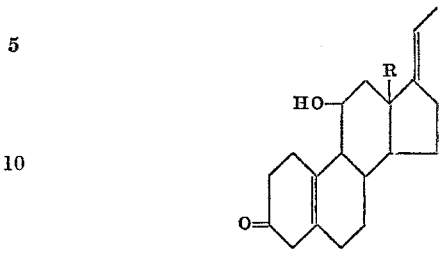

R:
CH₃CH₂CH₂
(CH₃)₂CHCH₂
CH₃(CH₂)₄CH₂

These are converted by the procedure of Example 1, step (i) to the following 4,17(20)dienes:

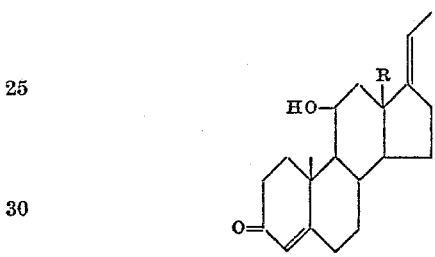

R:
CH₃CH₂CH₂
(CH₃)₂CHCH₂
CH₃(CH₂)₄CH₂

These are converted by the procedure of Example 1, step (j) to the following 17β-acetyl compounds:

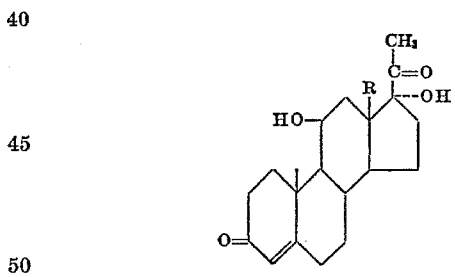

R:
CH₃CH₂CH₂
(CH₃)₂CHCH₂
CH₃(CH₂)₄CH₂

If a 10% molar excess of osmium tetroxide and no amine oxide peroxide is used, substantially the same results are obtained. These are converted by the procedure of Example 1, step (k), to the following compounds:

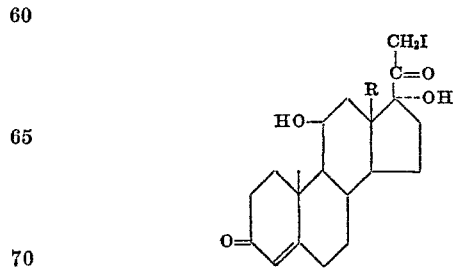

R:
CH₃CH₂CH₂
(CH₃)₂CHCH₂
CH₃(CH₂)₄CH₂

These are converted by the procedure of Example 1, step (1), to the following compounds:

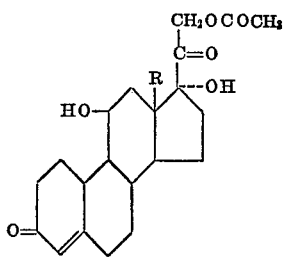

R:
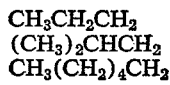
CH₃CH₂CH₂
(CH₃)₂CHCH₂
CH₃(CH₂)₄CH₂

The procedure is repeated, substituting sodium acetate for potassium acetate. Substantially the same results are obtained. The procedure is repeated substituting for the potassium acetate, potassium propionate, potassium n-butyrate and potassium n-hexanoate. There are obtained the corresponding 21-propionates, 21-n-butyrates and 21-n-hexanoates.

Example 8

The procedure of Example 2, step (a) is repeated substituting as substrates the products of Example 7. There are obtained the following:

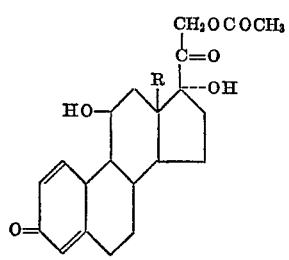

R:
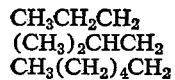
CH₃CH₂CH₂
(CH₃)₂CHCH₂
CH₃(CH₂)₄CH₂

The procedure of Example 2, step (b) is repeated substituting as substrates the products of Example 7. There are obtained the following:

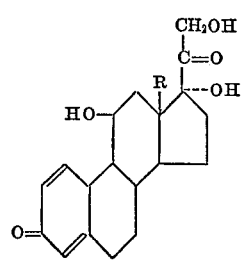

R:
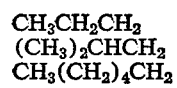
CH₃CH₂CH₂
(CH₃)₂CHCH₂
CH₃(CH₂)₄CH₂

The corresponding 21-propionates, 21-n-butyrates and 21-n-hexanoates are obtained by the procedure of Example 2, step (a).

Example 9

The procedure of Example 3, step (a) is repeated substituting as substrates the 17-β-acetyl compounds of Example 7. The following compounds are obtained:

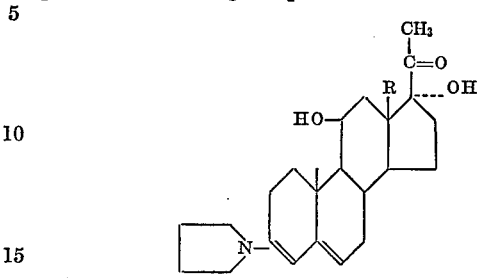

R:
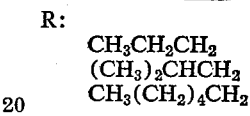
CH₃CH₂CH₂
(CH₃)₂CHCH₂
CH₃(CH₂)₄CH₂

These are converted by procedure of Example 3, step (b) to the following compounds:

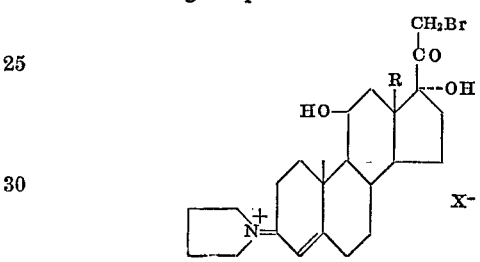

R:          X:
CH₃CH₂CH₂   Br
CH₃CH₂CH₂   Cl
(CH₃)₂CHCH₂ Cl
CH₃(CH₂)₄CH₂ Cl

These are converted by the procedure of Example 3, step (c) to the following compounds:

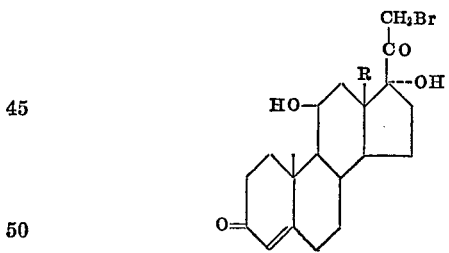

R:
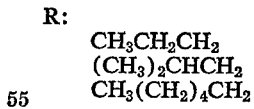
CH₃CH₂CH₂
(CH₃)₂CHCH₂
CH₃(CH₂)₄CH₂

These are converted by the procedure of Example 3, step (d), to the following compounds:

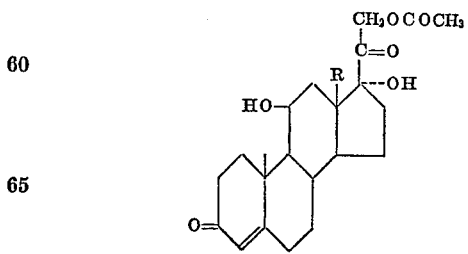

R:
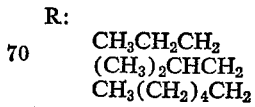
CH₃CH₂CH₂
(CH₃)₂CHCH₂
CH₃(CH₂)₄CH₂

Example 10

The procedure of Example 4 is repeated, substituting as substrates the corresponding pregn-4-ene 21-monoacetates provided as products in Example 7. The corresponding pregna-1,4-dienes shown as products in Example 8 are obtained.

Example 11

The procedure of Example 5 is repeated substituting as the substrate, the corresponding pregn-4-enes provided as products in Example 7. The following compounds are obtained:

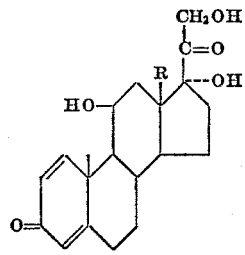

R:
CH₃CH₂CH₂
(CH₃)₂CHCH₂
CH₃(CH₂)₄CH₂

Example 12

The procedure of Example 6 is repeated substituting the corresponding substrates of Examples 7 and 8. The following compounds are obtained:

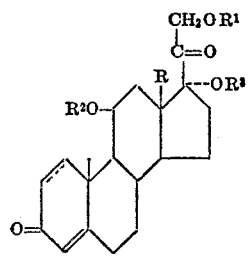

| R | R¹ | R² | R³ | Δ¹-unsaturation |
|---|---|---|---|---|
| CH₃CH₂CH₂ | H | H | H | No. |
| (CH₃)₂CHCH₂ | H | H | H | No. |
| CH₃(CH₂)₄CH₂ | H | H | H | No. |
| CH₃CH₂CH₂ | OCOCH₃ | OCOCH₃ | OCOCH₃ | No. |
| (CH₃)₂CHCH₂ | OCOCH₃ | OCOCH₃ | OCOCH₃ | No. |
| CH₃(CH₂)₄CH₂ | OCOCH₃ | OCOCH₃ | OCOCH₃ | No. |
| CH₃CH₂CH₂ | OCOCH₂CH₃ | OCOCH₂CH₃ | OCOCH₂CH₃ | No. |
| (CH₃)₂CHCH₂ | OCOCH₂CH₃ | OCOCH₂CH₃ | OCOCH₂CH₃ | No. |
| CH₃(CH₂)₄CH₂ | OCOC₅H₁₁-n | OCOC₅H₁₁-n | OCOC₅H₁₁-n | No. |
| CH₃CH₂CH₂ | H | H | H | Yes. |
| (CH₃)₂CHCH₂ | H | H | H | Yes. |
| CH₃(CH₂)₄CH₂ | H | H | H | Yes. |
| CH₃CH₂CH₂ | COOCH₃ | OCOCH₃ | OCOCH₃ | Yes. |
| (CH₃)₂CHCH₂ | OCOCH₃ | OCOCH₃ | OCOCH₃ | Yes. |
| CH₃(CH₂)₄CH₂ | OCOCH₃ | OCOCH₃ | OCOCH₃ | Yes. |
| CH₃CH₂CH₂ | OCOCH₂CH₃ | OCOCH₂CH₃ | OCOCH₂CH₃ | Yes. |
| (CH₃)₂CHCH₂ | OCOCH₂CH₃ | OCOCH₂CH₃ | OCOCH₂CH₃ | Yes. |
| CH₃(CH₂)₄CH₂ | OCOCH₂CH₃ | OCOCH₂CH₃ | OCOCH₂CH₃ | Yes. |
| CH₃CH₂CH₂ | OCOC₅H₁₁-n | OCOC₅H₁₁-n | OCOC₅H₁₁-n | Yes. |
| (CH₃)₂CHCH₂ | OCOC₅H₁₁-n | OCOC₅H₁₁-n | OCOC₅H₁₁-n | Yes. |
| CH₃(CH₂)₄CH₂ | OCOC₅H₁₁-n | OCOC₅H₁₁-n | OCOC₅H₁₁-n | Yes. |

Example 13

A pharmaceutical composition suitable for alleviating experimentally-induced edemae in rats is formulated to contain in each cubic centimeter, 25 mg. of 11β,17α,21-trihydroxy - 13 - ethyl - 18 - norpregn-4-ene-3,20-dione, 21-acetate in an aqueous saline suspension composed of 0.9% sodium chloride U.S.P., 0.5% sodium carboxymethylcellulose, 0.1% methylcellulose and 0.19% polysorbate 80 U.S.P., with 0.24% methylparaben U.S.P. and 0.026% propylparaben U.S.P. as preservatives.

A pharmaceutical composition suitable for veterinary topical use is formulated, each gram containing 10 mg. of 11β,17α,21-trihydroxy - 13 - ethyl-18-norpregna-1,4-diene-3,20-dione, 21-monoacetate, in a washable base containing sodium lauryl sulfate, propylene glycol, stearyl alcohol, cetyl alcohol, cholesterol, petrolatum, mineral oil and water with methylparaben and propylparaben as preservatives.

What is claimed is:

1. A process which comprises dehydrogenating a compound of the formula

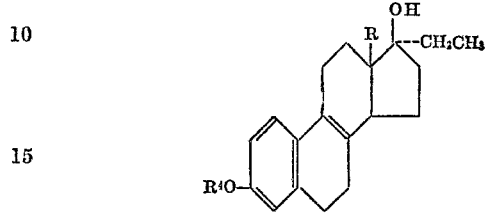

including the steps of:
(a) reacting a compound of the above formula wherein R is polycarbon (lower)alkyl and R⁴ is lower alkyl with an organic peracid selected from the group consisting of perbenzoic acid, monoperphthalic acid, performic acid and m-chloroperbenzoic acid and then with hydrochloric acid in an inert organic solvent to produce a compound of the formula:

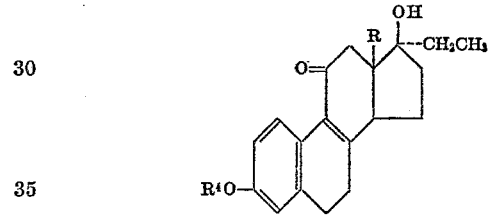

wherein R and R⁴ are as hereinabove defined;
(b) reacting said compound with an alkali metal or an alkaline earth metal in liquid ammonia or triethylamine to produce a compound of the formula:

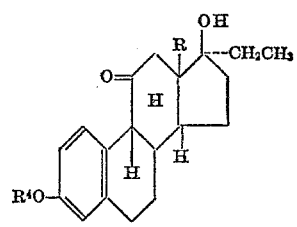

wherein R and R⁴ are as hereinabove defined;
(c) reacting said compound with a borohydride or an alkali metal alumino hydride to produce a compound of the formula:

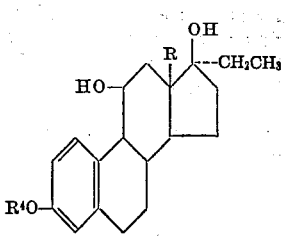

wherein R and R⁴ are as hereinabove defined;
(d) reacting said compound with a reagent selected from the group consisting of an acyl halide, acid anhydride and an ester of an acylating acid at a temperature of from about 75° C. to about 150° C. to produce a compound of the formula:

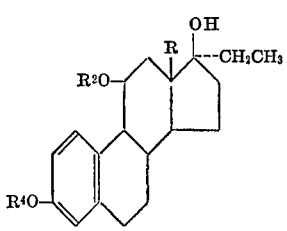

wherein R and R⁴ are as hereinabove defined and $R^2$ is (lower)alkanoyl;
(e) reacting said compound with a reagent selected from the group consisting of thionyl chloride in pyridine, phosphorus oxychloride, para-toluene sulfonic acid, sulfuric acid and perchloric acid to produce a compound of the formula:

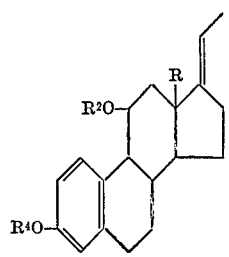

wherein R, $R^2$ and $R^4$ are as hereinabove defined;
(f) reacting said compound with a de-alkanoylating agent, which is an alkali metal hydroxide or an alkali metal alumino hydride, to produce a compound of the formula:

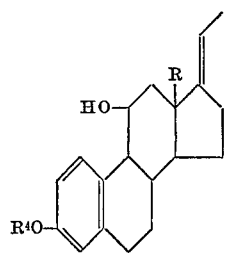

wherein R and $R^4$ are as hereinabove defined;
(g) reacting said compound with an alkali or alkaline earth metal in liquid ammonia or a (lower)alkyl amine in the presence of an alcohol to produce a compound of the formula:

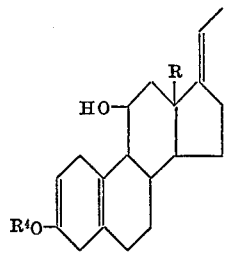

wherein R and $R^4$ are as hereinabove defined;
(h) reacting said compound with a mild hydrolysis agent to produce a compound of the formula:

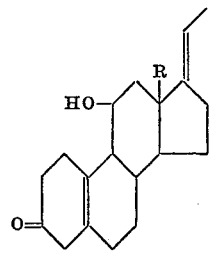

wherein R is as hereinabove defined;
(i) reacting said compound with a $ICH_2 \cdot ZnI$ to produce a compound of the formula:

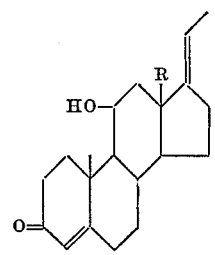

wherein R is as hereinabove defined;
(j) reacting said compound with a reagent selected from the group consisting of osmium tetroxide, a catalytic amount of osmium tetroxide combined with triethylamine oxide/hydrogen peroxide complex and N-methyl morpholine oxide peroxide to produce a compound of the formula:

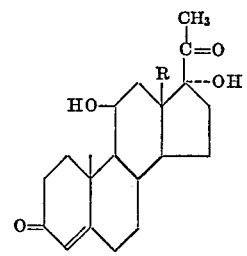

wherein R is as hereinabove defined;
(k) reacting said compound with an iodinating agent to produce a compound of the formula:

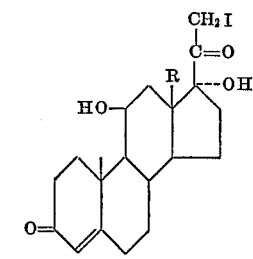

wherein R is as hereinabove defined; and
(l) reacting said compound with a reagent selected from the group consisting of sodium or potassium acetate, propionate, butyrate or valerate to produce a compound of the formula:

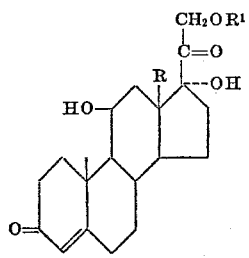

wherein R is as hereinabove defined and R¹ is (lower)alkanoyl.

2. A process as defined in claim 1 wherein, in said compound, R is ethyl, R¹ and R² are acetyl, and R⁴ is methyl.

3. A process as defined in claim 1 wherein
step (a) is effected with m-chloroperbenzoic acid, then with methanolic hydrogen chloride;
step (b) is effected with lithium in liquid ammonia;
step (c) is effected with lithium aluminum hydride;
step (d) is effected with acetic anhydride and pyridine at 90° C.;
step (e) is effected with phosphorus oxychloride;
step (f) is effected with methanolic sodium hydroxide or lithium aluminum hydride;
step (g) is effected with lithium and liquid ammonia in the presence of ethanol;
step (h) is effected with oxalic acid;
step (i) is effected with a methylenating agent prepared by reacting zinc/copper couple and methylene iodide;
step (j) is effected with osmium tetroxide or a catalytic amount of osmium tetroxide in the presence of an amine oxide peroxide;
step (k) is effected with calcium oxide and iodine; and
step (l) is effected with potassium acetate in acetone.

References Cited
UNITED STATES PATENTS

| | | | |
|---|---|---|---|
| 3,134,718 | 5/1964 | Nobile | 167—65 |
| 3,281,415 | 10/1966 | Schneider et al. | 260—239.55 |
| 3,557,162 | 1/1971 | Lens et al. | 260—397.45 |
| 3,646,012 | 2/1972 | Gadsby et al. | 260—239.5 |

OTHER REFERENCES

Applezweig, Steroid Drugs, pp. 635 and 692 (1962), McGraw-Hill, New York.

HENRY A. FRENCH, Primary Examiner

U.S. Cl. X.R.

260—239.5, 397.5; 424—243